United States Patent
Zhang et al.

(10) Patent No.: US 11,430,427 B2
(45) Date of Patent: Aug. 30, 2022

(54) METHOD AND ELECTRONIC DEVICE FOR SEPARATING MIXED SOUND SIGNAL

(71) Applicant: Beijing Dajia Internet Information Technology Co., Ltd., Beijing (CN)

(72) Inventors: Ning Zhang, Beijing (CN); Yan Li, Beijing (CN); Tao Jiang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/352,856

(22) Filed: Jun. 21, 2021

(65) Prior Publication Data

US 2021/0312902 A1 Oct. 7, 2021

Related U.S. Application Data

(63) Continuation of application No. PCT/CN2019/121730, filed on Nov. 28, 2019.

(30) Foreign Application Priority Data

Dec. 20, 2018 (CN) .......................... 201811564607.7

(51) Int. Cl.
*G10L 15/02* (2006.01)
*G10L 15/20* (2006.01)
(Continued)

(52) U.S. Cl.
CPC ............. *G10L 15/02* (2013.01); *G10L 15/20* (2013.01); *G10L 17/20* (2013.01); *G10L 25/30* (2013.01)

(58) Field of Classification Search
CPC ..... G10L 21/0272; G10L 25/30; G10L 25/48; G10L 15/02; G10L 15/20; G10L 17/20
See application file for complete search history.

(56) References Cited

U.S. PATENT DOCUMENTS

2009/0067647 A1 3/2009 Yoshizawa et al.
2015/0380014 A1* 12/2015 Le Magoarou ......... G10L 25/81
704/258

(Continued)

FOREIGN PATENT DOCUMENTS

CN 101040324 A 9/2007
CN 106024005 A 10/2016
(Continued)

OTHER PUBLICATIONS

V. Sharma, "A Deep Neural Network based approach for vocal extraction from songs," 2015 IEEE International Conference on Signal and Image Processing Applications (ICSIPA), 2015, pp. 116-121. (Year: 2015).*

(Continued)

*Primary Examiner* — Angela A Armstrong
(74) *Attorney, Agent, or Firm* — Meunier Carlin & Curfman LLC (57) ABSTRACT

This application can provide a method and electronic device for separating mixed sound signal. The method includes: obtaining a first hidden variable representing a human voice feature and a second hidden variable representing an accompaniment sound feature by inputting feature data of a mixed sound extracted from a mixed sound signal into a coding model for the mixed sound; obtaining first feature data of a human voice and second feature data of an accompaniment sound by inputting the first hidden variable and the second hidden variable into a first decoding model for the human voice and a second decoding model for the accompaniment sound respectively; and obtaining, based on the first feature data and the second feature data, the human voice and the accompaniment sound.

13 Claims, 8 Drawing Sheets

(51) Int. Cl.
*G10L 17/20* (2013.01)
*G10L 25/30* (2013.01)

(56) References Cited

U.S. PATENT DOCUMENTS

| | | | |
|---|---|---|---|
| 2016/0284346 | A1 | 9/2016 | Visser et al. |
| 2018/0330707 | A1 | 11/2018 | Zhu et al. |
| 2020/0043517 | A1* | 2/2020 | Jansson .................. G10L 15/16 |

FOREIGN PATENT DOCUMENTS

| | | |
|---|---|---|
| CN | 106653048 A | 5/2017 |
| CN | 106971741 A | 7/2017 |
| CN | 107680611 A | 2/2018 |
| CN | 108847238 A | 11/2018 |
| CN | 108962277 A | 12/2018 |
| CN | 109801644 A | 5/2019 |
| JP | H0351899 A | 3/1991 |
| KR | 101121505 B1 | 3/2012 |

OTHER PUBLICATIONS

Z. Rafii, A. Liutkus, F. Stöter, S. I. Mimilakis, D. FitzGerald and B. Pardo, "An Overview of Lead and Accompaniment Separation in Music," in IEEE/ACM Transactions on Audio, Speech, and Language Processing, vol. 26, No. 8, pp. 1307-1335, Aug. 2018. (Year: 2018).*

International Search Report issued by the International Searching Authority (ISA/CN) in PCT Application No. PCT/CN2019/121730 dated Feb. 28, 2020. 4 pages, including translation.

Chinese National Intellectual Property Administration. Office Action issued in Chinese Application No. 201811564607.7 dated Jun. 3, 2020. 13 pages, including translation.

Chinese National Intellectual Property Administration. Notification to Grant the Patent Right for Invention issued in Chinese Application No. 201811564607.7 dated Feb. 10, 2021. 3 pages, including translation.

Wu Bengu. "Research on Separation of Singing Voice and Music Accompaniment." A master thesis submitted to University of Electronic Science and Technology of China, School of Electronic Engineering. Apr. 29, 2015. 70 pages. http://www.ixueshu.com. English abstract.

Burute, Harshada, and P. B. Mane. "Separation of singing voice from music accompaniment using matrix factorization method." 2015 International Conference on Applied and Theoretical Computing and Communication Technology (iCATccT). IEEE, 2015. 6 pages.

* cited by examiner

METHOD AND ELECTRONIC DEVICE FOR SEPARATING MIXED SOUND SIGNAL

CROSS REFERENCE TO RELATED APPLICATIONS

This application is the continuation application of International Application No. PCT/CN2019/121730, filed on Nov. 28, 2019, which is based on and claims priority to the Chinese Patent Application No. 201811564607.7, filed on Dec. 20, 2018, in the China National Intellectual Property Administration and entitled "MIXED SOUND SIGNAL SEPARATION METHOD AND APPARATUS, ELECTRONIC DEVICE AND READABLE MEDIUM", the disclosures of which are herein incorporated by reference in their entireties.

FIELD

The application relates to the field of computer software applications, particularly a method and electronic device for separating mixed sound signal.

BACKGROUND

Pop music in general is mixed by superposing a human voice and an accompaniment. Separating mixed music into a human voice and an accompaniment (voice and accompaniment separation) is a challenge. The voice and accompaniment separation plays an important role in music editing and music retrieval. The improvement in performance of the model of voice and accompaniment separation can greatly improve the effect of the subsequent processing.

The current mainstream model of voice and accompaniment separation is an end-to-end deterministic model, which calculates the mask of each sound source in the time-frequency diagram is calculated, and then multiplies the mask by the time-frequency diagram of the mixed sound to obtain a time-frequency feature of the separated sound sources, thereby obtaining a time-domain representation of the separated sound sources.

SUMMARY

The application discloses a method and electronic device for separating mixed sound signal.

According to a first aspect of embodiments of the application, there is provided a method for separating mixed sound signal, including:

extracting feature data of a mixed sound from a mixed sound signal;

obtaining a first hidden variable representing a human voice feature and a second hidden variable representing an accompaniment sound feature by inputting the feature data of the mixed sound into a coding model for the mixed sound;

obtaining first feature data of a human voice and second feature data of an accompaniment sound by inputting the first hidden variable and the second hidden variable into a first decoding model for the human voice and a second decoding model for the accompaniment sound respectively; and obtaining the human voice and the accompaniment sound based on the first feature data and the second feature data.

According to a second aspect of embodiments of the application, there is provided an apparatus for separating mixed sound signal, including:

a module for extracting feature, configured to extract feature data of a mixed sound from a mixed sound signal;

a module for generating hidden variable, configured to obtain a first hidden variable representing a human voice feature and a second hidden variable representing an accompaniment sound feature by inputting the feature data of the mixed sound into a coding model for the mixed sound;

a module for generating human voice feature, configured to obtaining first feature data of a human voice by inputting the first hidden variable into a first decoding model for the human voice;

a module for generating accompaniment sound feature, configured to obtain second feature data of an accompaniment sound by inputting the second hidden variable into a second decoding model for the accompaniment sound;

a module for generating human voice, configured to obtain the human voice based on the first feature data; and a module for generating accompaniment sound, configured to obtain the accompaniment sound based on the second feature data.

According to a third aspect of embodiments of the application, there is provided an electronic device, including; a processor; and a memory for storing executable instructions of the processor; where the processor is configured to execute the method as described in any of the above.

According to a fourth aspect of embodiments of the application, there is provided a non-transitory computer-readable storage medium, where the computer-readable storage medium stores computer instructions, and the computer instructions, when executed, implement the method as described in any of the above.

According to a fifth aspect of embodiments of the application, there is further provided a computer program product including a computer program. The computer program includes program instructions, and when the program instructions are executed by an electronic device, the electronic device executes the method as described in any of the above.

DETAILED DESCRIPTION OF THE EMBODIMENTS

In this application, the training sample for a human voice, the verification sample for the human voice and the human voice sound signal are all pure human voice signals (or data). Accordingly, the training sample for an accompaniment sound, the verification sample for the accompaniment sound and the accompaniment sound signal are all pure accompaniment sound signals (or data). In addition, naming the audio data as the training sample and verification sample is just to distinguish the samples used in different steps. Distinguishing hidden variables into first, second, third, fourth . . . is just to distinguish the hidden variables used in different scenarios, and does not mean that these hidden variables are different in attributes.

Figure 1:
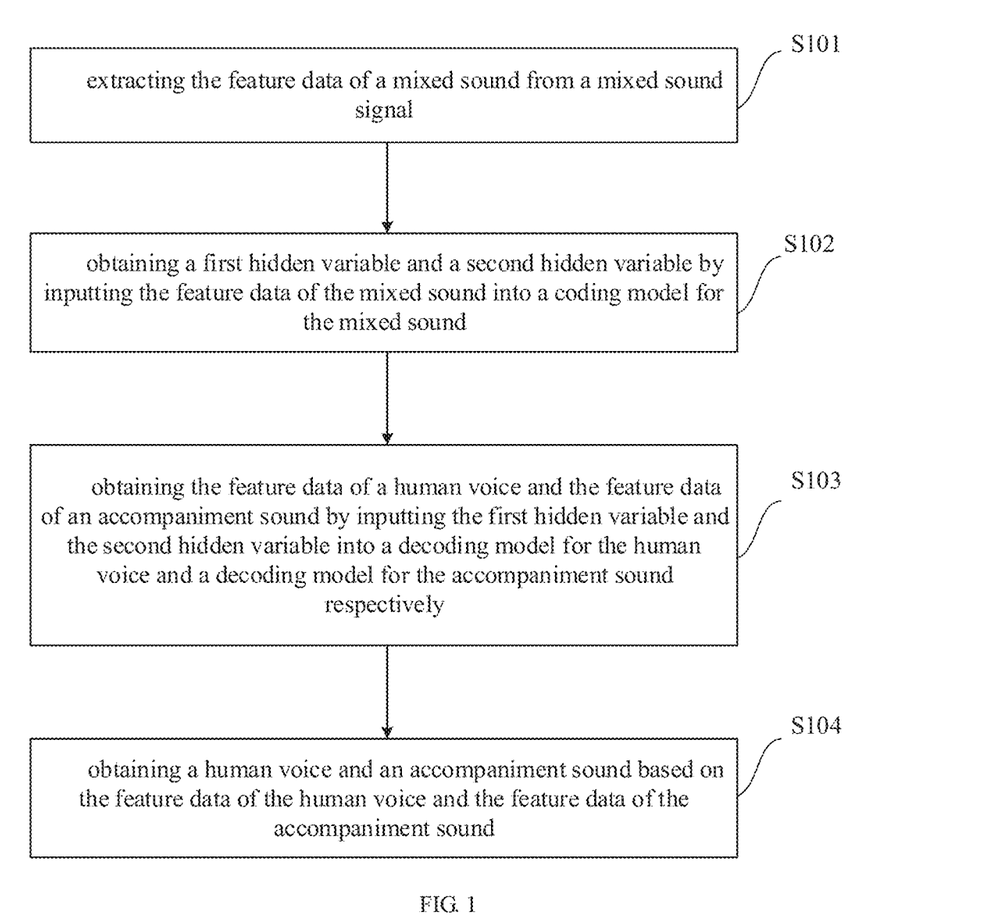
FIG. 1 is a flow chart of a method for separating mixed sound signal according to an exemplary embodiment of the application.

FIG. 1 is a flow chart of a method for separating mixed sound signal according to an exemplary embodiment of the application. This embodiment is applied to an application scenario of separating a human voice and an accompaniment from mixed sound. The method specifically includes the following steps.

Step S101, extracting the feature data of a mixed sound from a mixed sound signal.

Step S102, obtaining a first hidden variable and a second hidden variable by inputting the feature data of the mixed sound into a coding model for the mixed sound.

Step S103, obtaining the feature data of a human voice and the feature data of an accompaniment sound by inputting the first hidden variable and the second hidden variable into a decoding model for the human voice and a decoding model for the accompaniment sound respectively.

Step S104, obtaining the human voice and the accompaniment sound based on the feature data of the human voice and the feature data of the accompaniment sound.

In some embodiments of the application, the coding model for the mixed sound, the decoding model for the human voice and the decoding model for the accompaniment sound are all neural network models obtained by training. The coding model for the mixed sound receives the feature data of the mixed sound and outputs the first hidden variable and the second hidden variable, the human voice is obtained by the decoding model for the human voice based on the first hidden variable, and the accompaniment sound is obtained by the decoding model for the accompaniment sound based on the second hidden variable, thereby separating the accompaniment and the human voice from the mixed sound. The first hidden variable represents a human voice feature, and the second hidden variable represents an accompaniment sound feature.

Figure 2A:
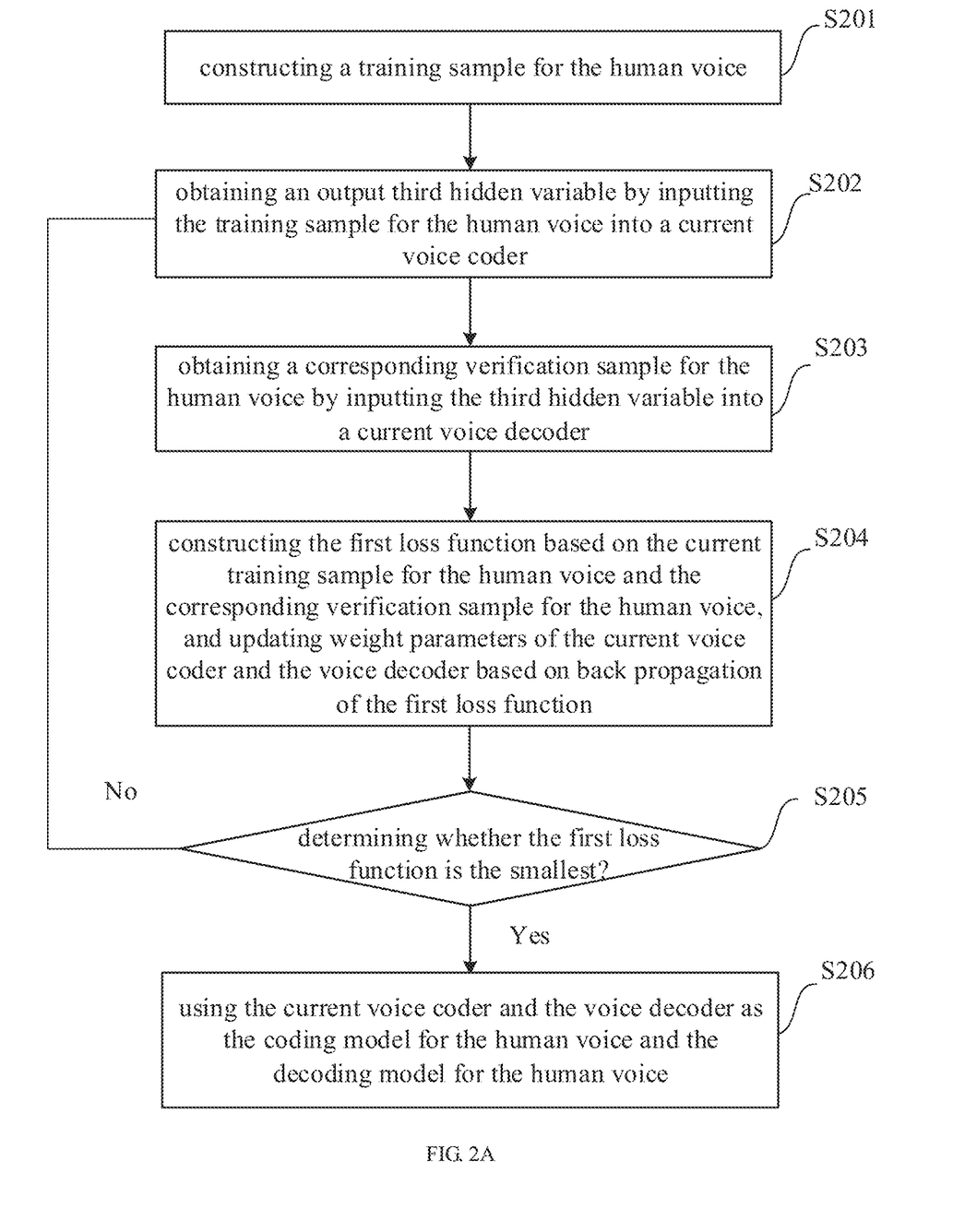
FIG. 2A is a specific embodiment of training steps according to an exemplary embodiment of the application.

The coding model and decoding model for the human voice are obtained by training of the human voice coder and the voice decoder. Referring to FIG. 2A, the training includes the following steps.

Step S201, constructing a training sample for the human voice.

The training sample is iteratively processed by steps S202-S205 until a first loss function is minimized.

Step S202, obtaining an output third hidden variable by inputting the training sample for the human voice into a current voice coder, where the third hidden variable represents a human voice feature.

Step S203, obtaining a corresponding verification sample for the human voice by inputting the third hidden variable into a current voice decoder.

Step S204, constructing the first loss function based on the current training sample for the human voice and the corresponding verification sample for the human voice, and updating weight parameters of the current voice coder and the voice decoder based on back propagation of the first loss function.

Step S205, determining, whether the first loss function is the smallest, if not, the process proceeds to S202, and if yes, the iteration ends.

Step S206, using the current voice coder and the voice decoder as the coding model for the human voice and the decoding model for the human voice upon the completion of the iteration.

Figure 2B:
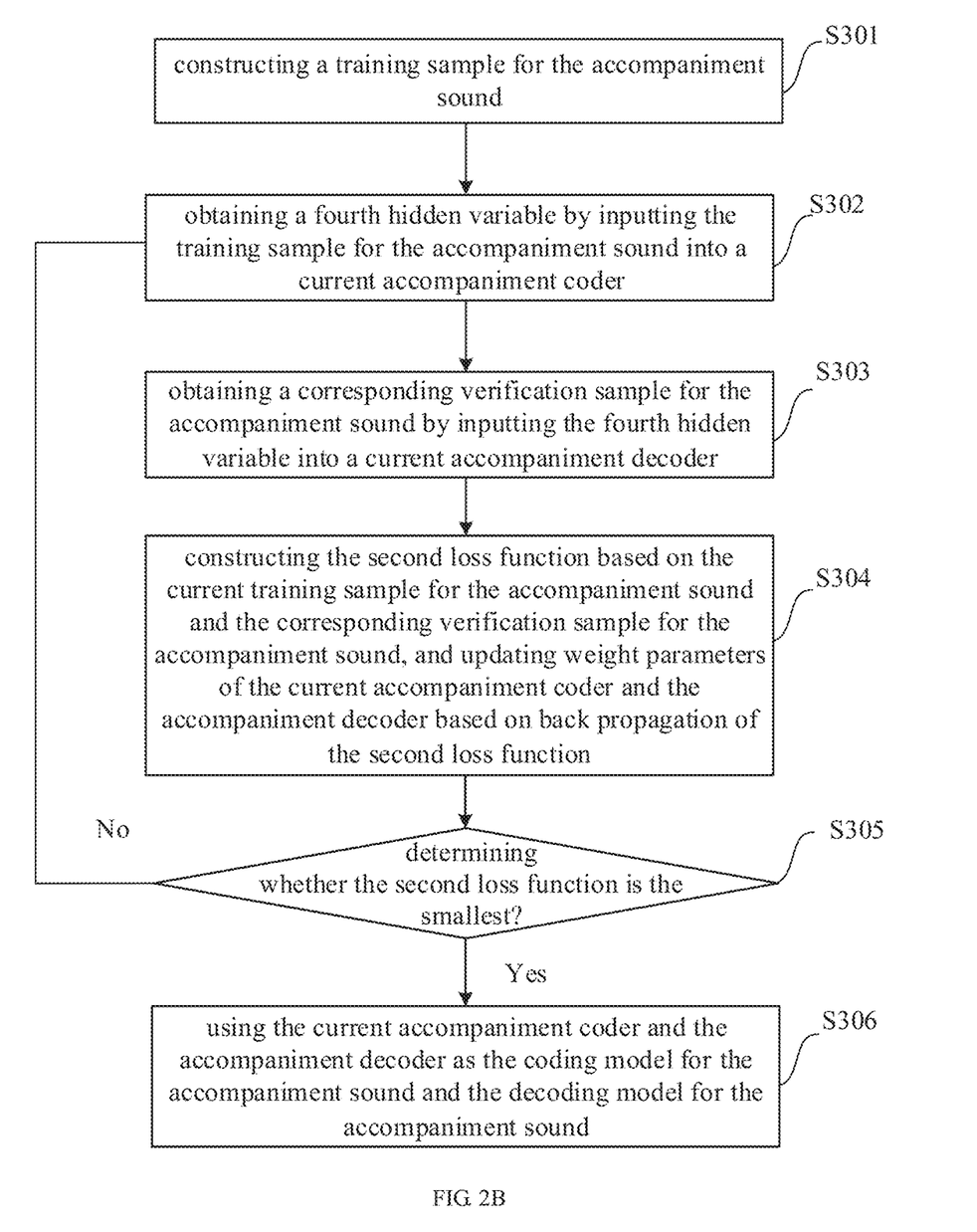
FIG. 2B is a specific embodiment of training steps according to another exemplary embodiment of the application.

The coding model and decoding model for the accompaniment sound are obtained by training of the accompaniment coder and the accompaniment decoder. Referring to FIG. 2B, the training includes the following steps.

Step S301, constructing a training sample for the accompaniment sound.

The training sample is iteratively processed by steps S302-S305 until a second loss function is minimized.

Step S302, obtaining a fourth hidden variable by inputting the training sample for the accompaniment sound into a current accompaniment coder, where the fourth hidden variable represents an accompaniment sound feature.

Step S303, obtaining a corresponding verification sample for the accompaniment sound by inputting the fourth hidden variable into a current accompaniment decoder.

Step S304, constructing the second loss function based on the current training sample for the accompaniment sound and the corresponding verification sample for the accompaniment sound, and updating weight parameters of the current accompaniment coder and the accompaniment decoder based on back propagation of the second loss function.

Step S305, determining whether the second loss function is the smallest, if not, the process proceeds to S302, and if yes, the iteration ends.

Step S306, using the current accompaniment coder and the accompaniment decoder as the coding model for the accompaniment sound and the decoding model for the accompaniment sound upon the completion of the iteration.

Figure 2C:
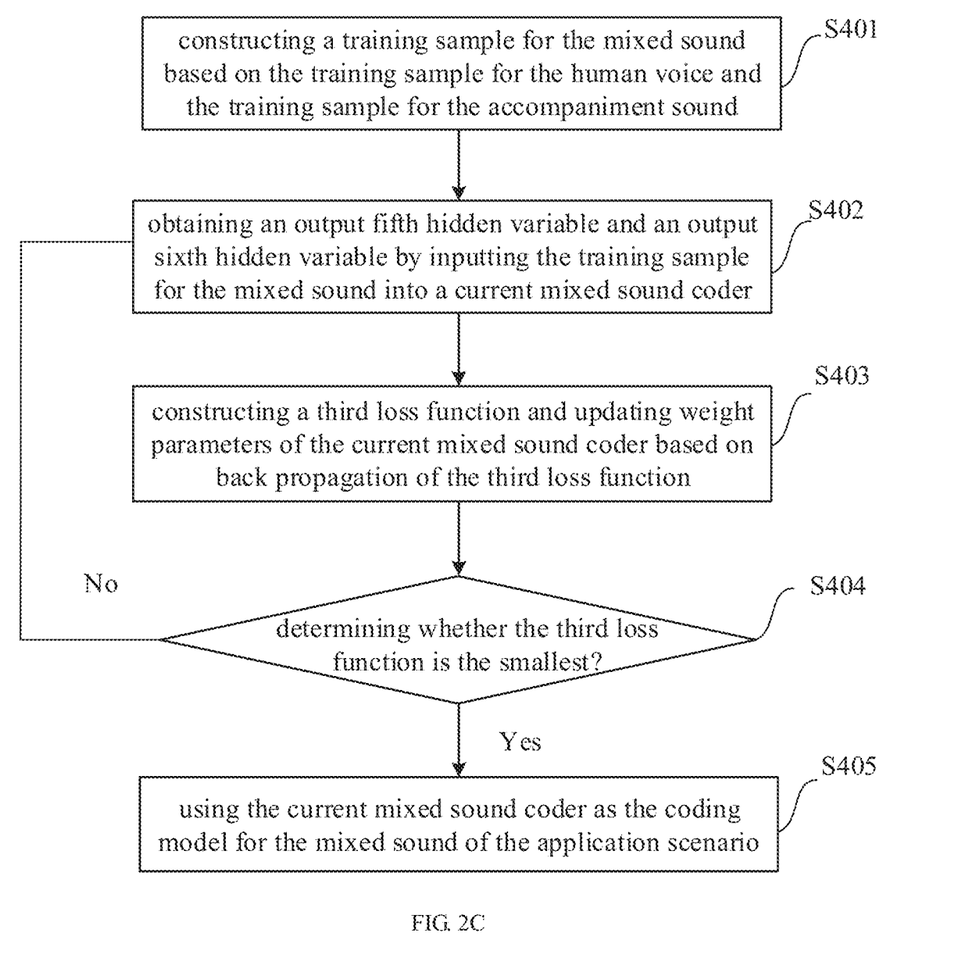
FIG. 2C is a specific embodiment of training steps according to the third exemplary embodiment of the application.

The coding model for the mixed sound is obtained by training of the mixed sound coder. Referring to FIG. 2C, the training includes the following steps.

Step S401, constructing a training sample for the mixed sound based on the training sample for the human voice and the training sample for the accompaniment sound.

The training sample for the mixed sound is iteratively processed by steps S402-S403 until a loss function is minimized.

Step S402, obtaining an output fifth hidden variable and an output sixth hidden variable by inputting the training sample for the mixed sound into a current mixed sound coder, where the fifth hidden variable represents a human voice feature, and the sixth hidden variable represents an accompaniment sound feature.

Step S403, constructing a third loss function based on the current fifth hidden variable and sixth hidden variable, the third hidden variable previously obtained by the training of the voice coder and fourth hidden variable previously obtained by the training of the accompaniment coder, the first loss function composed of verification sample and training sample for the human voice and the second loss function composed of the training sample and verification sample for the accompaniment sound, and updating weight parameters of the current mixed sound coder based on back propagation of the third loss function.

Step S404, determining whether the third loss function is the smallest, if not, the process proceeds to S402, and if yes, the iteration ends.

Step S405, using the current mixed sound coder as the coding model for the mixed sound of the application scenario upon the completion of the iteration.

In the above model training, the adopted training samples for the human voice are pure human voices, the adopted training samples for the accompaniment sound are pure accompaniment sounds, and the training samples for the mixed sound are obtained by mixing each training sample for the human voice and each training sample for the accompaniment sound. Moreover, the loss function for the mixed sound is constructed based on the loss functions and the hidden variables during the training of the human voice and the accompaniment sound, and therefore, w % ben the loss functions obtained by training the human voice and the accompaniment sound converge, the loss functions of the hidden variables also tend to converge, thereby finally obtaining the coding model for the mixed sound.

It should be understood that the sound features involved in the above embodiments, including the mixed sound feature, the human voice feature and the accompaniment sound feature, are all extracted from the original sound signals and represent the essential sound features in the original sounds. The sound feature is, for example, a spectrogram of sound. The extractions for sound features are all existing technologies, and will not be repeated here.

Figure 3:
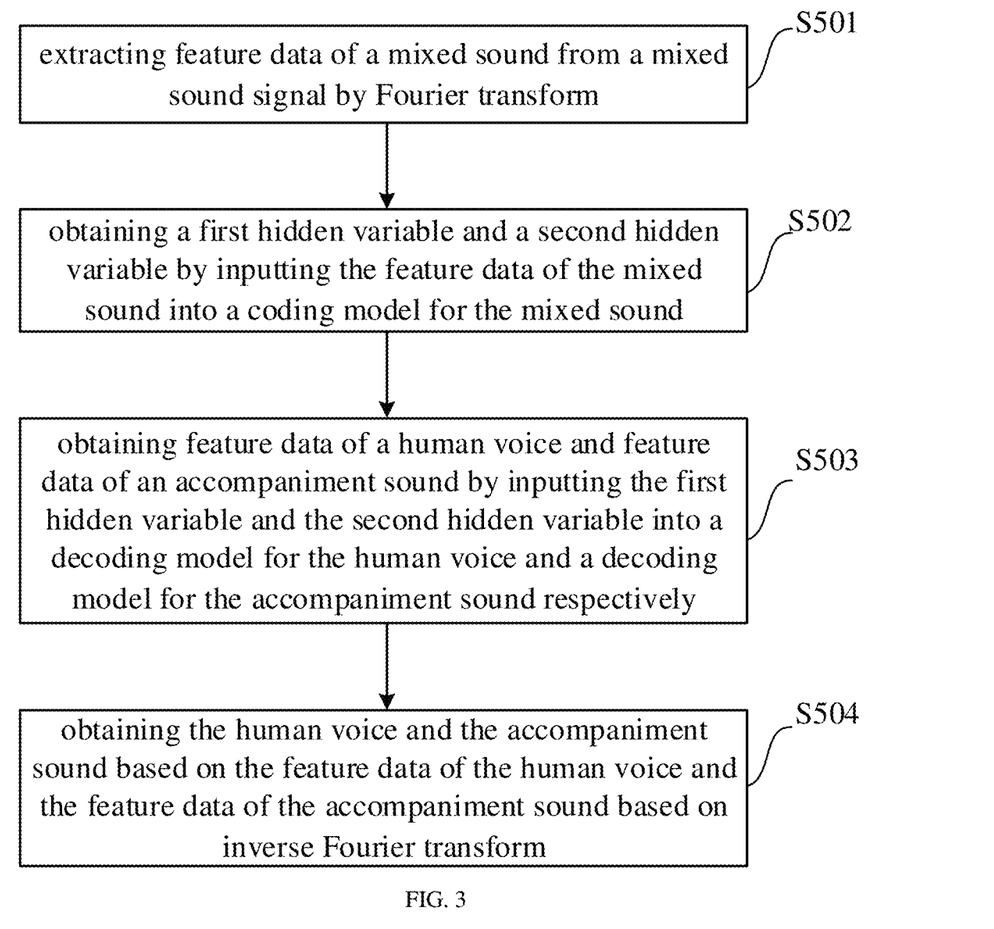
FIG. 3 is a flow chart of a method for separating mixed sound signal according to another exemplary embodiment of the application.

FIG. 3 is a flow chart of a method for separating mixed sound signal according to an exemplary embodiment of the application.

Step S501, extracting feature data of a mixed sound from a mixed sound signal by Fourier transform. In some embodiments, the feature data of the mixed sound may be extracted from the mixed sound signal by short-time Fourier transform.

Step S502, obtaining a first hidden variable and a second hidden variable by inputting the feature data of the mixed sound into a coding model for the mixed sound.

Step S503, obtaining feature data of a human voice and feature data of an accompaniment sound by inputting the first hidden variable and the second hidden variable into a decoding model for the human voice and a decoding model for the accompaniment sound respectively.

Step S504, obtaining the human voice and the accompaniment sound based on the feature data of the human voice and the feature data of the accompaniment sound based on inverse Fourier transform. In some embodiments, the human voice and the accompaniment sound may be obtained based on the feature data of the human voice and the feature data of the accompaniment sound based on inverse short-time Fourier transform.

In some embodiments of the application, the spectrum feature of the mixed sound is obtained from the mixed sound signal based on the Fourier transform, and inputted into the model to obtain the first hidden variable representing the human voice spectrum and the second hidden variable representing the accompaniment spectrum, and further, the human voice and the accompaniment sound are reconstructed according to the first hidden variable and the second hidden variable, thereby separating the human voice and the accompaniment sound from the mixed sound signal.

Figure 4A:
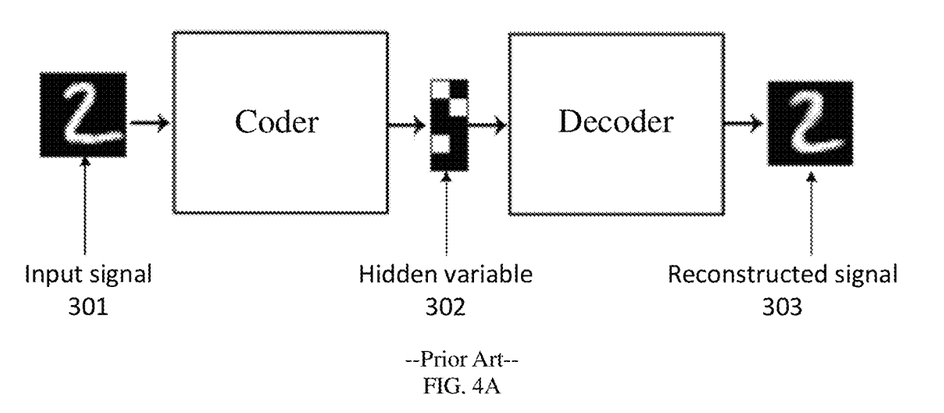
FIG. 4A is a schematic structural diagram of an auto encoder including a coder and a decoder.

FIG. 4A is a schematic structural diagram of an auto encoder including a coder and a decoder in the prior art.

An auto encoder is a type of neural network that attempts to copy the input to the output after training. There is a hidden layer inside the auto encoder, which can generate codes as the input of the decoder. Referring to FIG. 4A, a hidden variable 302 generated by the coder through an input signal 301 is the input of the decoder, and a reconstructed signal 303 is generated by the decoder through the hidden variable 302. To obtain an available model of the coder and the decoder, it is required to set a loss function, and then weight parameters of the coder and the decoder are continuously updated by iterative training based on the purpose of minimizing the loss function, thereby obtaining the final coder model and the decoder model. Furthermore, the neural network may be regarded as being composed of two parts: a coder represented by the function h=f(x) and a decoder r=g(h) for generating reconstructions. The weight parameter of g (f(x))=x is implemented by the training of the auto encoder.

Figure 4B:
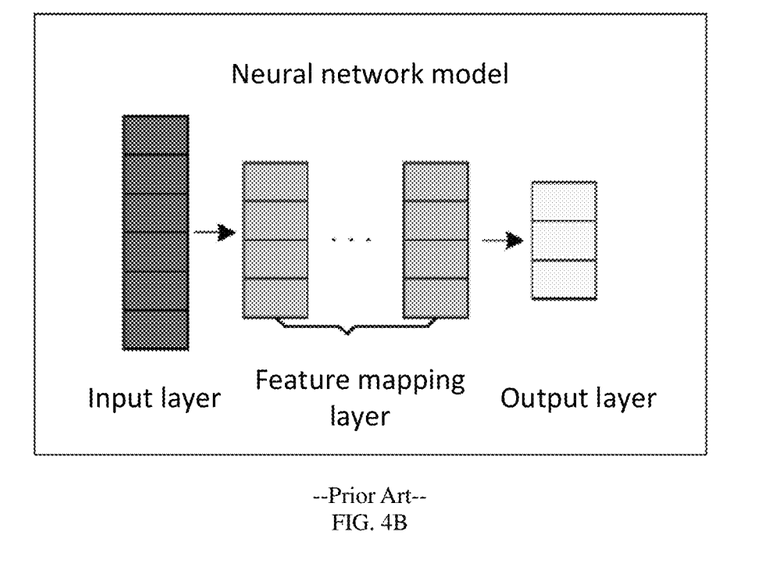
FIG. 4B is a schematic structural diagram of a neural network in the prior art.

When constructing the coder and the decoder, many other types of neural networks, such as Recurrent Neural Network (RNN), Deep Neural Network (DNN), Convolutional Neural Network (CNN), Back Propagation (BP) and the like, may be adopted. The structure of a typical neural network is shown in FIG. 4B. An output layer can be derived from an input layer through multiple feature mapping layers.

Figure 5:
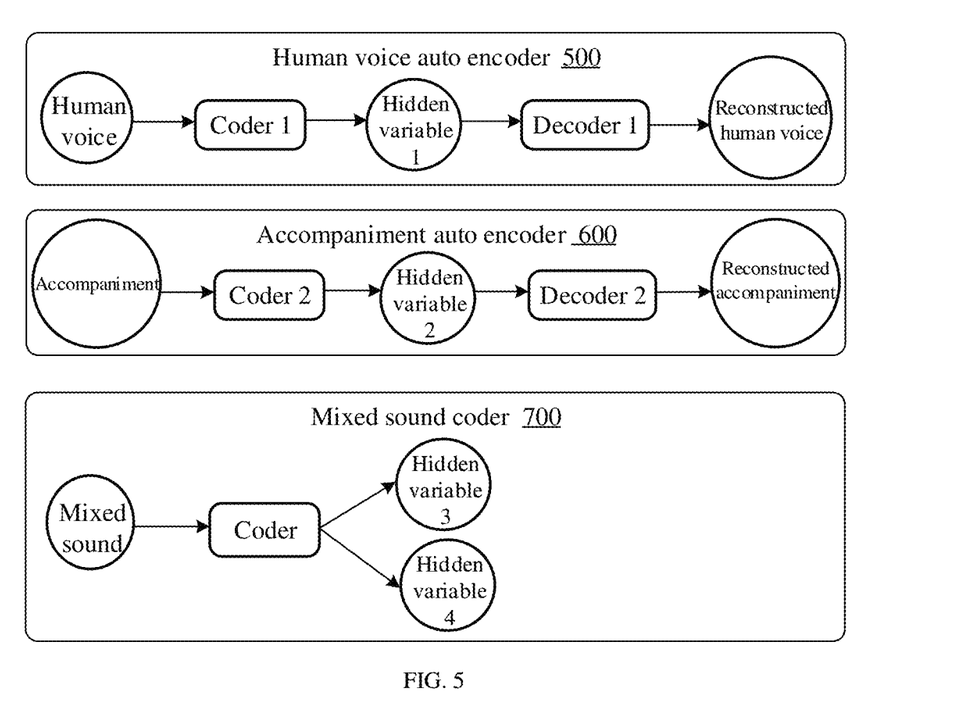
FIG. 5 is a schematic structural diagram of a human voice auto encoder, an accompaniment auto encoder and a mixed sound coder according to some embodiments of the application.

Schematic structural diagrams of the voice coder-decoder, the accompaniment coder-decoder and the mixed sound coder as shown in FIG. 5 can be obtained by applying the structure of the above coder and decoder to the embodiments of the application.

Referring to FIG. 5, each human voice is processed through the coder 1 (i.e., the voice coder) to obtain a hidden variable 1, and the hidden variable 1 is input to the decoder 1 (i.e., the voice decoder) to obtain a reconstructed human voice. Weight parameters of the coder 1 and the decoder 1 are updated according to back propagation of the loss function between the reconstructed human voice and the input human voice. The above steps are repeated on each human voice sample in the training sample for human voice, and the finally obtained coder 1 and decoder 1 are used as the coder model and decoder model for the human voice.

Similarly, each accompaniment is processed through the coder 2 (i.e., the accompaniment coder) to obtain a hidden variable 2, and the hidden variable 2 is input to the decoder 2 (i.e., the accompaniment decoder) to obtain reconstructed accompaniment sound. Weight parameters of the coder 2 and the decoder 2 are updated according to back propagation of the loss function between the reconstructed accompaniment and the input accompaniment. The above steps are repeated on each accompaniment sample in the training sample for the accompaniment, and the finally obtained coder 2 and decoder 2 are used as the coder model and decoder model for the accompaniment.

Finally, the training sample for the mixed sound is obtained by mixing based on the training sample for the human voice and the training sample for the accompaniment sound. That is, each training sample for mixed sound is mixed from a training sample for the human voice and a training sample for the accompaniment sound. Each training sample for the mixed sound is input into the mixed sound coder to obtain reconstructed mixed sound, the reconstructed mixed sound and training sample for the mixed sound, the loss function of the corresponding training sample for the human voice and the loss function of the corresponding training sample for the accompaniment sound together construct the loss function of the mixed sound coder, and the weight parameters of the mixed sound coder are continuously updated with the purpose of minimizing the loss function. The finally obtained mixed sound coder is used as the coding model for the mixed sound.

To help understanding, the following mathematical formula is used to describe the loss function of the mixed sound coder. The loss function $\Lambda$ of the mixed sound coder is expressed by the following formula:

$$\Lambda = \|v - \hat{v}\|_2^2 + \|a - \hat{a}\|_2^2 + \|h_v - \hat{h}_v\|_2^2 + \|h_a - \hat{h}_a\|_2^2,$$

v represents the training sample for the human voice, $\hat{v}$ represents the verification sample for the human voice (i.e., reconstructed human voice), a represents the training sample for the accompaniment sound, $\hat{a}$ represents the verification sample for the accompaniment sound (i.e., reconstructed accompaniment), $h_v$ and $h_a$ represent the two hidden variables (hidden variables 3 and 4 in the figure above) output by the mixed sound coder, $\hat{h}_v$ represents the hidden variable (hidden variable 1 in the figure above) output by the voice coder, and $\hat{h}_a$ represents the hidden variable (hidden variable 2 in the figure above) output by the accompaniment coder. $\|h_v - \hat{h}_v\|_2^2$ represents the loss function of the human voice auto encoder, and $\|h_a - \hat{h}_a\|_2^2$ represents the loss function of the accompaniment auto encoder.

The above embodiment achieves the separation of the human voice and the accompaniment sound from the mixed sound signal, resulting in a sound signal with a low signal-to-noise ratio. The model training steps can be performed offline, thereby saving terminal computing resources, and the model application steps can be performed online, thereby completing the separation of the mixed sound signal in real time.

Figure 6:
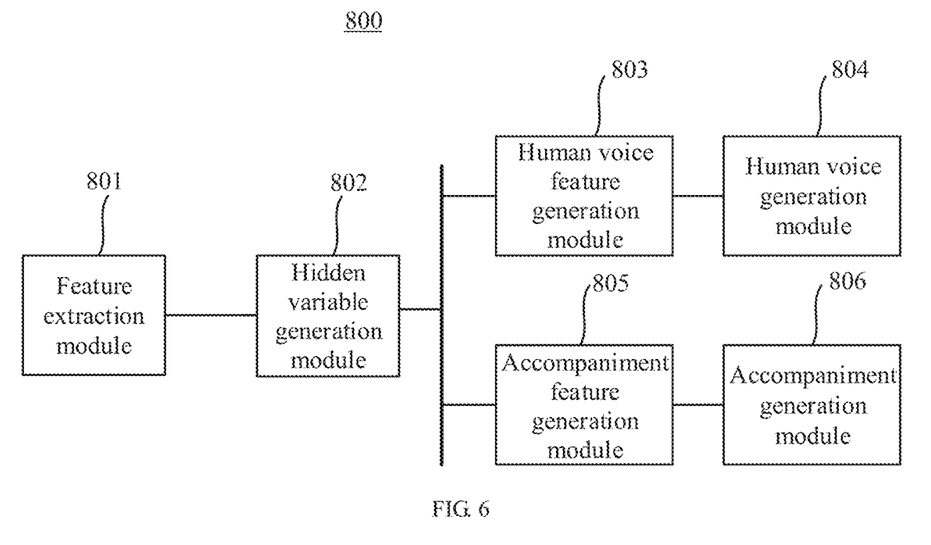
FIG. 6 is a schematic structural diagram of an apparatus for separating mixed sound signal according to some embodiments of the application.

FIG. 6 shows a schematic structural diagram of a mixed sound signal separation apparatus according to an embodiment of the present application. Referring to FIG. 6, the apparatus 800 includes a feature extraction module 801, a hidden variable generation module 802, a human voice feature generation module 803, an accompaniment feature generation module 805, a human voice generation module 804 and an accompaniment generation module 806.

The feature extraction module 801 is configured to extract feature data of a mixed sound from a mixed sound signal.

The hidden variable generation module 802 is configured to obtain a first hidden variable and a second hidden variable by inputting the feature data of the mixed sound into a coding model for the mixed sound, where the first hidden variable represents a human voice feature, and the second hidden variable represents an accompaniment sound feature.

The human voice feature generation module 803 is configured to obtain feature data of a human voice by inputting the first hidden variable into a decoding model for the human voice.

The accompaniment feature generation module 805 is configured to obtain feature data of an accompaniment sound by inputting the second hidden variable into a decoding model for the accompaniment sound.

The human voice generation module 804 is configured to obtain a human voice based on the feature data of the human voice.

The accompaniment generation module 806 is configured to obtain an accompaniment sound based on the feature data of the accompaniment sound.

In some embodiments, the above apparatus further includes: a human voice sample collection module and a human voice model training module.

The human voice sample collection module is configured to construct training samples for the human voice. Each of the training samples for the human voice is a human voice feature extracted from a pure human voice.

The human voice model training module is configured to perform iteration by using the following steps until a first loss function is minimized: a training sample for the human voice is input into a current voice coder to obtain an output third hidden variable, where the third hidden variable represents a human voice feature; the third hidden variable is input into a current voice decoder to obtain a corresponding verification sample for the human voice; based on the current training sample and the corresponding verification sample for the human voice, a first loss function is constructed, and based on back propagation of the first loss function, weight parameters of the current voice coder and the voice decoder are updated; and upon the completion of the iteration, the current voice coder and the voice decoder are used as the coding model and decoding model for the human voice.

In some embodiments, the above apparatus further includes: an accompaniment sample collection module and an accompaniment model training module.

The accompaniment sample collection module is configured to construct training samples for the accompaniment sound. Each of the training samples for the accompaniment sound is an accompaniment sound feature extracted from a pure accompaniment sound.

The accompaniment model training module is configured to perform iteration by using the following steps until a second loss function is minimized: a training sample for the accompaniment sound is input into a current accompaniment coder to obtain an output fourth hidden variable, where the fourth hidden variable represents an accompaniment sound feature; the fourth hidden variable is input into a current accompaniment decoder to obtain a corresponding verification sample for the accompaniment sound; based on the current training sample and corresponding verification sample for the accompaniment sound, a second loss function is constructed, and based on back propagation of the second loss function, weight parameters of the current accompaniment coder and the accompaniment decoder are updated; and upon the completion of the iteration, the current accompaniment coder and the accompaniment decoder are used as the coding model and decoding model for the accompaniment sound.

In some embodiments, the above apparatus further includes: a mixed sound sample collection module and a mixed sound model training module.

The mixed sound sample collection module is configured to construct training samples for the mixed sound based on the training samples for the human voice and the training samples for the accompaniment sound. Each of the training samples for mixed sound is a mixed sound feature extracted from a mixture of the pure human voice and the accompaniment sound.

The mixed sound model training module is configured to perform iteration by using the following steps until a third loss function is minimized: a training sample for the mixed sound is input into a current mixed coder to obtain an output fifth hidden variable and a sixth hidden variable; based on the current fifth hidden variable, sixth hidden variable, third hidden variable and fourth hidden variable, and the first loss function and the second loss function, a third loss function is constructed, and based on back propagation of the third loss function, weight parameters of the current mixed coder are updated; and upon the completion of the iteration, the current mixed coder is used as the coding model for the mixed sound.

In some embodiments, the feature data of the mixed sound, the feature data of the human voice and the feature data of the accompaniment sound are all data representing the depth features of the sound signal extracted from the original voice signal by Fourier transform.

It should be understood that the above apparatus and method are corresponding to each other, and therefore, the apparatus is described in a correspondingly simplified manner.

Figure 7:
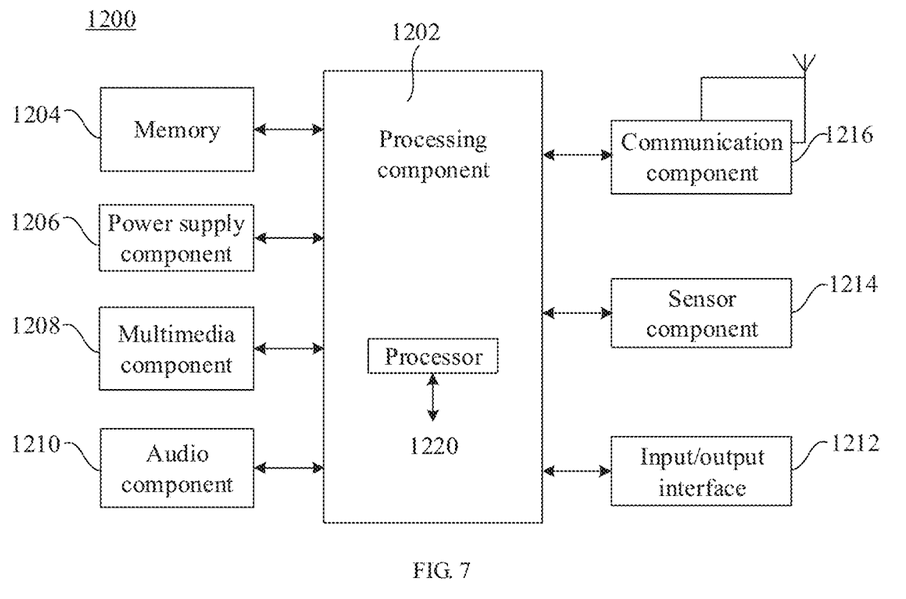
FIG. 7 is a block diagram of a first electronic device for executing a method for separating a mixed sound signal according to an exemplary embodiment of the application.

FIG. 7 is a block diagram of an electronic device that executes the above method according to an exemplary embodiment. For example, the electronic device 1200 may be a mobile phone, a computer, a digital broadcasting terminal, a message transceiver, a game console, a tablet device, a medical device, a fitness device, a personal digital assistant or the like.

Referring to FIG. 7, the electronic device 1200 may include one or more of the following components: a processing component 1202, a memory 1204, a power supply component 1206, a multimedia component 1208, an audio component 1210, an input/output (I/O) interface 1212, a sensor component 1214 and a communication component 1216.

The processing component 1202 typically controls overall operations of the electronic device 1200, such as operations associated with display, telephone calls, data communication, camera operations and recording operations. The processing component 1202 may include one or more processors 1220 to execute instructions to complete all or part of the steps of the above method. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store various types of data to support operations in the device 1200. Examples of these data include instructions for any application or method operating on the electronic device 1200, contact data, phone book data, messages, pictures, videos and the like. The memory 1204 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1206 provides power to various components of the electronic device 1200. The power supply component 1206 may include a power supply management system, one or more power supplies, and other components associated with generation, management and distribution of power for the electronic device 1200.

The multimedia component 1208 includes a screen that provides an output interface between the electronic device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touch, swipe and gestures on the touch panel. The touch sensor may not only sense the boundary of a touch or swipe action, but also detect the duration and pressure related to the touch or swipe operation. In some embodiments, the multimedia component 1208 includes a front camera and/or a rear camera. When the device 1200 is in an operation mode, such as a shooting mode or a video mode, the front camera and/or the rear camera can receive external multimedia data. Each of the front camera and the rear camera may be a fixed optical lens system or have focal length and optical zoom capabilities.

The audio component 1210 is configured to output and/or input audio signals. For example, the audio component 1210 includes a microphone (MIC). When the electronic device 1200 is in an operation mode, such as a call mode, a recording mode and a voice recognition mode, the microphone is configured to receive an external audio signal. The received audio signal may be further stored in the memory 1204 or transmitted via the communication component 1216. In some embodiments, the audio component 1210 further includes a speaker for outputting audio signals.

The I/O interface 1212 provides an interface between the processing component 1202 and a peripheral interface module. The above peripheral interface module may be a keyboard, a click wheel, buttons and the like. These buttons may include, but are not limited to: a home button, a volume button, an enable button and a lock button.

The sensor component 1214 includes one or more sensors for providing various aspects of state evaluation for the electronic device 1200. For example, the sensor component 1214 may detect the on/off state of the device 1200 and the relative positioning of the components which are, for example, a display and a keypad of the electronic device 1200. The sensor component 1214 may also detect the position change of the electronic device 1200 or a component of the electronic device 1200, the presence or absence of contact between the user and the electronic device 1200, the orientation or acceleration/deceleration of the electronic device 1200, and the temperature change of the electronic device 1200. The sensor component 1214 may include a proximity sensor configured to detect the presence of nearby objects when there is no physical contact. The sensor component 1214 may further include a light sensor, such as a CMOS or CCD image sensor, for use in imaging applications. In some embodiments, the sensor component 1214 may further include an acceleration sensor, a gyroscope sensor, a magnetic sensor, a pressure sensor or a temperature sensor.

The communication component 1216 is configured to facilitate wired or wireless communication between the electronic device 1200 and other devices. The electronic device 1200 may access a wireless network based on a communication standard, such as WiFi, an operator network (such as 2G, 3G, 4G or 5G) or a combination thereof. In an exemplary embodiment, the communication component 1216 receives a broadcast signal from an external broadcast management system or broadcasts related information via a broadcast channel. In an exemplary embodiment, the communication component 1216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the electronic device 1200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to execute the above method.

In some embodiments, there is further provided a non-transitory computer-readable storage medium including instructions, for example, a memory 1204 including instructions. The above instructions may be executed by the processor 1220 of the electronic device 1200 to complete the above method. For example, the non-transitory computer-readable storage medium may be an ROM, a random access memory (RAM), a CD-ROM, a magnetic tape, a floppy disk, an optical data storage device or the like.

Figure 8:
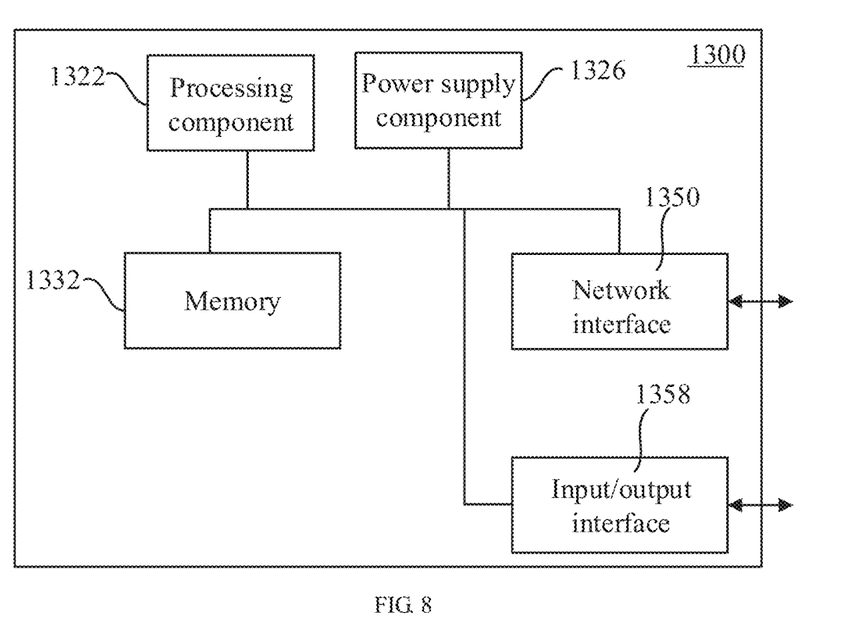
FIG. 8 is a block diagram of a second electronic device for executing a method for separating a mixed sound signal according to an exemplary embodiment of the application.

FIG. 8 is a block diagram of an electronic device that executes the above method according to an exemplary embodiment. For example, the electronic device 1300 may be provided as a server. Referring to FIG. 8, the electronic device 1300 includes a processing component 1322, which further includes one or more processors, and a memory resource represented by a memory 1332, for storing instructions executable by the processing component 1322, such as applications. The application stored in the memory 1332 may include one or more modules each corresponding to a set of instructions. In addition, the processing component 1322 is configured to execute instructions to execute the above method for separating mixed sound signal.

The electronic device 1300 may further include a power supply component 1326 configured to execute power supply management of the electronic device 1300, a wired or wireless network interface 1350 configured to connect the electronic device 1300 to the network, and an input/output (I/O) interface 1358. The electronic device 1300 can operate based on an operating system stored in the memory 1332, for example, Windows Server™, Mac OS X™, Unix™, Linux™, FreeBSD™ or the like.

Figure 9:
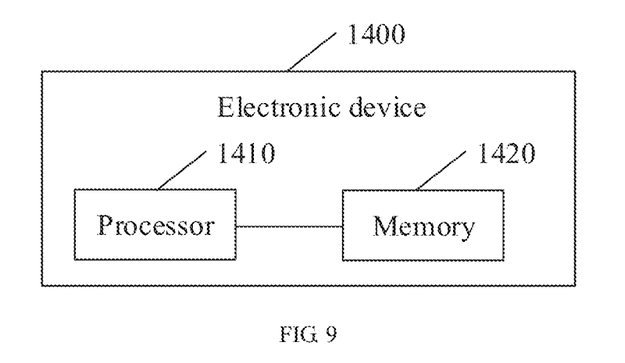
FIG. 9 is a block diagram of a third electronic device for executing a method for separating a mixed sound signal according to an exemplary embodiment of the application.

FIG. 9 is a block diagram of another electronic device that executes the above method according to an exemplary embodiment. Referring to FIG. 9, the electronic device 1400 includes: a processor 1410; a memory 1420 for storing executable instructions of the processor; where the processor 1410 is configured to: extract feature data of a mixed sound from a mixed sound signal; obtain a first hidden variable and a second hidden variable by inputting the feature data of the mixed sound data into a coding model for the mixed sound, where the first hidden variable represents a human voice feature, and the second hidden variable represents an accompaniment sound feature; obtain feature data of a human voice and feature data of an accompaniment sound by inputting the first hidden variable and the second hidden variable into a decoding model for the human voice and a decoding model for the accompaniment sound; and obtain the human voice and the accompaniment based on the feature data for the human voice and the feature data for the accompaniment sound.

Optionally, the processor 1410 is further configured to: construct a training sample for the human voice, process the training sample for the human voice iteratively until a loss function is minimized by following steps: obtaining a third hidden variable by inputting the training sample for the human voice into a voice coder; where the third hidden variable represents a human voice feature; outputting the third hidden variable; obtaining a verification sample for the human voice by inputting the third hidden variable into a voice decoder, where the verification sample for the human voice corresponds to the training sample for the human voice; constructing the first loss function based on the training sample for the human voice and the corresponding verification sample for the human voice; and updating weight parameters of the voice coder and decoder based on back propagation of the first loss function; and use the voice coder and decode as a coding model for the human voice and the decoding model for the human voice upon the process of iteration being completed.

Optionally, the processor 1410 is further configured to: construct a training sample for the accompaniment sound; process the training sample for the accompaniment sound iteratively until a loss function is minimized by following steps: obtaining a fourth hidden variable by inputting the training sample for the accompaniment sound into an accompaniment coder; where the fourth hidden variable represents an accompaniment sound feature; outputting the fourth hidden variable; obtaining a verification sample for the accompaniment sound by inputting the fourth hidden variable into an accompaniment decoder, where the verification sample corresponds to the training sample for the accompaniment sound; constructing the second loss function based on the training sample for the accompaniment sound and the corresponding verification sample for the accompaniment sound; and updating weight parameters of the accompaniment coder and decoder based on back propagation of the second loss function, and use the accompaniment coder and decoder as a coding model and the decoding model for the accompaniment sound upon the iteration being completed.

Optionally, the processor 1410 is further configured to: construct a training sample for the mixed sound based on the training sample for the human voice and the training sample for the accompaniment sound; process the training sample for the mixed sound iteratively until a loss function is minimized by following steps: obtaining a fifth hidden variable and a sixth hidden variable by inputting the training sample for the mixed sound into a mixed sound coder, where the fifth hidden variable represents a human voice feature, and the sixth hidden variable represents an accompaniment sound feature; outputting the fifth hidden variable and the sixth hidden variable; constructing the third loss function based on the fifth hidden variable, the sixth hidden variable, a corresponding third hidden variable, a corresponding fourth hidden variable, a corresponding first loss function, and a corresponding second loss function; and updating weight parameters of the mixed sound coder based on back propagation of the third loss function; and use the mixed sound coder as the coding model for the mixed sound upon the iteration being completed.

Optionally, the voice coder, the voice decoder, the accompaniment coder, the accompaniment decoder and the mixed sound coder are each one of CNN, DNN and RNN neural networks.

Optionally, a frequency domain feature is extracted from the mixed sound signal based on Fourier transform as the feature data of the mixed sound.

Optionally, the human voice and the accompaniment sound are respectively obtained based on inverse Fourier transform.

In an exemplary embodiment, there is further provided a computer program product including a computer program product. The computer program includes program instructions, and when the program instructions are executed by the electronic device, the electronic device executes the above method.

Those skilled in the art will easily think of other implementations of the application after considering the specification and practicing the invention disclosed herein. The application is intended to cover any variations, uses or adaptations of the application. These variations, uses or adaptations follow the general principles of the application and include common knowledge or conventional technical means in the technical field that are not disclosed in the application. The specification and the embodiments are only to be regarded as exemplary, and the true scope and spirit of the application are pointed out by the following claims.

It should be understood that the application is not limited to the precise structure that has been described above and shown in the accompanying drawings, and various modifications and changes can be made without departing from its scope. The scope of the application is only limited by the appended claims.

What is claimed is:

1. A method for separating mixed sound signal, comprising:
    extracting feature data of a mixed sound from a mixed sound signal;
    obtaining a first hidden variable representing a human voice feature and a second hidden variable representing an accompaniment sound feature simultaneously by inputting the feature data of the mixed sound into a coding model for the mixed sound, wherein the coding model for the mixed sound is a neural network model;
    obtaining first feature data of a human voice and second feature data of an accompaniment sound by inputting the first hidden variable and the second hidden variable into a first decoding model for the human voice and a second decoding model for the accompaniment sound respectively; and
    obtaining the human voice and the accompaniment sound based on the first feature data and the second feature data;
    wherein the method further comprises:
    constructing a first training sample for the human voice;
    processing the first training sample iteratively until a first loss function is minimized by following steps:
    obtaining a third hidden variable representing the human voice feature by inputting the first training sample into a voice coder;
    outputting the third hidden variable;
    obtaining a first verification sample for the human voice by inputting the third hidden variable into a voice decoder, wherein the first verification sample corresponds to the first training sample;
    constructing the first loss function based on the first training sample and the first verification sample; and
    updating weight parameters of the voice coder and decoder based on back propagation of the first loss function; and
    using the voice coder and decoder as a first coding model for the human voice and the first decoding model upon said processing the first training sample iteratively being completed.

2. The method of claim 1, further comprising:
    constructing a second training sample for the accompaniment sound;
    processing the second training sample iteratively until a second loss function is minimized by following steps:
    obtaining a fourth hidden variable representing the accompaniment sound feature by inputting the second training sample into an accompaniment coder;
    outputting the fourth hidden variable;
    obtaining a second verification sample for the accompaniment sound by inputting the fourth hidden variable into an accompaniment decoder, wherein the second verification sample corresponds to the second training sample;
    constructing the second loss function based on the second training sample and the second verification sample; and
    updating weight parameters of the accompaniment coder and decoder based on back propagation of the second loss function; and
    using the accompaniment coder and decoder as a second coding model for the accompaniment sound and the second decoding model upon said processing the second training sample iteratively being completed.

3. The method of claim 2, further comprising:
    constructing a third training sample for the mixed sound based on the first training sample and the second training sample;
    processing the third training sample iteratively until a third loss function is minimized by following steps:
    obtaining a fifth hidden variable representing the human voice feature and a sixth hidden variable representing the accompaniment sound feature by inputting the third training sample into a mixed sound coder;
    outputting the fifth hidden variable and the sixth hidden variable;
    constructing the third loss function based on the fifth hidden variable, the sixth hidden variable, a corresponding third hidden variable, a corresponding fourth hidden variable, a corresponding first loss function, and a corresponding second loss function; and
    updating weight parameters of the mixed sound coder based on back propagation of the third loss function; and
    using the mixed sound coder as the coding model for the mixed sound upon said processing the third training sample iteratively being completed.

4. The method of claim 3, wherein each of the voice coder, the voice decoder, the accompaniment coder, the accompaniment decoder and the mixed sound coder is one of Convolutional Neural Network (CNN), Deep Neural Network (DNN) and Recurrent Neural Network (RNN).

5. The method of claim 1, wherein the feature data of the mixed sound is obtained by extracting a frequency domain feature from the mixed sound signal based on Fourier transform.

6. The method of claim 5, wherein the human voice and the accompaniment sound is obtained by Fourier inverse transform.

7. An electronic device, comprising:
    a processor; and
    a memory for storing executable instructions of the processor;
    wherein the processor is configured to:
    extract feature data of a mixed sound from a mixed sound signal;
    obtain a first hidden variable representing a human voice feature and a second hidden variable representing an accompaniment sound feature simultaneously by inputting the feature data of the mixed sound into a coding model for the mixed sound, wherein the coding model for the mixed sound is a neural network model;
    obtain first feature data of a human voice and second feature data of an accompaniment sound by inputting the first hidden variable and the second hidden variable into a first decoding model for the human voice and a second decoding model for the accompaniment sound respectively; and obtain the human voice and the accompaniment sound based on the first feature data and the second feature data;
wherein the processor is further configured to:
construct a first training sample for the human voice;
process the first training sample iteratively until a first loss function is minimized by following steps:
obtaining a third hidden variable representing the human voice feature by inputting the first training sample into a voice coder;
outputting the third hidden variable;
obtaining a first verification sample for the human voice by inputting the third hidden variable into a voice decoder, wherein the first verification sample corresponds to the first training sample;
constructing the first loss function based on the first training sample and the first verification sample; and
updating weight parameters of the voice coder and decoder based on back propagation of the first loss function; and
use the voice coder and decoder as a first coding model for the human voice and the first decoding model upon the process of iteration being completed.

8. The device of claim 7, wherein the processor is further configured to:
construct a second training sample for the accompaniment sound;
process the second training sample iteratively until a second loss function is minimized by following steps:
obtaining a fourth hidden variable representing the accompaniment sound feature by inputting the second training sample into an accompaniment coder;
outputting the fourth hidden variable;
obtaining a second verification sample for the accompaniment sound by inputting the fourth hidden variable into an accompaniment decoder, wherein the second verification sample corresponds to the second training sample;
constructing the second loss function based on the second training sample and the second verification sample; and
updating weight parameters of the accompaniment coder and decoder based on back propagation of the second loss function; and
use the accompaniment coder and decoder as a second coding model for the accompaniment sound and the second decoding model upon the process of iteration being completed.

9. The device of claim 8, wherein the processor is further configured to:
construct a third training sample for the mixed sound based on the first training sample and the second training sample;
process the third training sample iteratively until a third loss function is minimized by following steps:
obtaining a fifth hidden variable representing the human voice feature and a sixth hidden variable representing the accompaniment sound feature by inputting the third training sample into a mixed sound coder;
outputting the fifth hidden variable and the sixth hidden variable;
constructing the third loss function based on the fifth hidden variable, the sixth hidden variable, a corresponding third hidden variable, a corresponding fourth hidden variable, a corresponding first loss function, and a corresponding second loss function; and
updating weight parameters of the mixed sound coder based on back propagation of the third loss function; and
use the mixed sound coder as the coding model for the mixed sound upon the process of iteration being completed.

10. The device of claim 9, wherein each of the voice coder, the voice decoder, the accompaniment coder, the accompaniment decoder and the mixed sound coder is one of Convolutional Neural Network (CNN), Deep Neural Network (DNN) and Recurrent Neural Network (RNN).

11. The device of claim 7, wherein the processor is configured to obtain the feature data of the mixed sound by extracting a frequency domain feature from the mixed sound signal based on Fourier transform.

12. The device of claim 11, wherein the processor is configured to obtain the human voice and the accompaniment sound by Fourier inverse transform.

13. A non-transitory computer-readable storage medium, wherein the computer-readable storage medium stores computer instructions, and the computer instructions are for executing a method for separating mixed sound signal, wherein the method comprises:
extracting feature data of a mixed sound from a mixed sound signal;
obtaining a first hidden variable representing a human voice feature and a second hidden variable representing an accompaniment sound feature simultaneously by inputting the feature data of the mixed sound into a coding model for the mixed sound, wherein the coding model for the mixed sound is a neural network model;
obtaining first feature data of a human voice and second feature data of an accompaniment sound by inputting the first hidden variable and the second hidden variable into a first decoding model for the human voice and a second decoding model for the accompaniment sound respectively; and
obtaining the human voice and the accompaniment sound based on the first feature data and the second feature data;
wherein the method further comprises:
constructing a first training sample for the human voice;
processing the first training sample iteratively until a first loss function is minimized by following steps:
obtaining a third hidden variable representing the human voice feature by inputting the first training sample into a voice coder;
outputting the third hidden variable;
obtaining a first verification sample for the human voice by inputting the third hidden variable into a voice decoder, wherein the first verification sample corresponds to the first training sample;
constructing the first loss function based on the first training sample and the first verification sample; and
updating weight parameters of the voice coder and decoder based on back propagation of the first loss function; and
using the voice coder and decoder as a first coding model for the human voice and the first decoding model upon said processing the first training sample iteratively being completed.

* * * * *